United States Patent
Sammes

(10) Patent No.: US 6,492,050 B1
(45) Date of Patent: Dec. 10, 2002

(54) INTEGRATED SOLID OXIDE FUEL CELL AND REFORMER

(75) Inventor: Nigel Mark Sammes, Wrentham, MA (US)

(73) Assignee: Acumentrics Corporation, Westwood, MA (US)

( * ) Notice: Subject to any disclaimer, the term of this patent is extended or adjusted under 35 U.S.C. 154(b) by 78 days.

(21) Appl. No.: 09/509,704

(22) PCT Filed: Oct. 1, 1998

(86) PCT No.: PCT/NZ98/00151
§ 371 (c)(1),
(2), (4) Date: Jun. 9, 2000

(87) PCT Pub. No.: WO99/17390
PCT Pub. Date: Apr. 8, 1999

(30) Foreign Application Priority Data

Oct. 1, 1997 (NZ) .............................................. 328885

(51) Int. Cl.[7] .............................................. H01M 8/10
(52) U.S. Cl. .............................. 429/31; 429/17; 429/38; 429/26
(58) Field of Search .............................. 429/31, 30, 34, 429/38, 39, 17, 13, 26

(56) References Cited

U.S. PATENT DOCUMENTS

| | | | |
|---|---|---|---|
| 3,377,203 A | 4/1968 | Möbius et al. ................. | 136/86 |
| 4,374,184 A | 2/1983 | Somers et al. ................. | 429/17 |
| 4,395,468 A | 7/1983 | Isenberg ....................... | 429/31 |
| 4,729,931 A | 3/1988 | Grimble ....................... | 429/17 |
| 4,808,491 A | 2/1989 | Reichner ....................... | 429/13 |
| 4,824,742 A | 4/1989 | Parry ........................... | 429/30 |
| 4,827,606 A | 5/1989 | Szreders et al. ............... | 29/729 |
| 5,082,751 A | 1/1992 | Reichner ....................... | 429/19 |
| 5,190,834 A | 3/1993 | Kendall ........................ | 429/31 |
| 5,200,279 A | 4/1993 | Draper et al. .................. | 429/30 |
| 5,244,752 A | 9/1993 | Zymboly ....................... | 429/31 |
| 5,336,569 A | 8/1994 | Misawa et al. ................. | 429/31 |
| 5,486,428 A * | 1/1996 | Gardner et al. ................ | 429/19 |
| 5,733,675 A * | 3/1998 | Dederer et al. ................ | 429/19 |
| 5,741,605 A * | 4/1998 | Gillet et al. ................... | 429/31 |
| 5,827,620 A | 10/1998 | Kendall ........................ | 429/31 |

FOREIGN PATENT DOCUMENTS

| | | |
|---|---|---|
| EP | 0 505 184 A1 | 3/1992 |
| WO | WO 94/22178 | 9/1994 |

* cited by examiner

*Primary Examiner*—Stephen Kalafut
*Assistant Examiner*—R Alejandro
(74) *Attorney, Agent, or Firm*—Bromberg & Sunstein LLP

(57) ABSTRACT

A disclosed apparatus for generating electrical power has, according to one embodiment of the invention, a plurality of tubular solid oxide fuel cells contained in a reaction chamber. The fuel cells are secured at one end thereof in a manifold block, the other ends thereof passing freely through apertures in a baffle plate to reside in a combustion chamber. Reaction gases are supplied to the insides of the tubular fuel cells from a plenum chamber below the manifold block and to the reaction chamber surrounding the outsides of the fuel cells through an annular inlet path, which may include a reformation catalyst. The gases inlet path to the plenum chamber, and the annular inlet path surround the reaction chamber, are both in heat conductive relation with the reaction chamber and the combustion chamber, and raise the gases to formation and reaction temperatures as appropriate.

23 Claims, 5 Drawing Sheets

INTEGRATED SOLID OXIDE FUEL CELL AND REFORMER

TECHNICAL FIELD

The present invention relates to devices for the generation of electrical power and in particular to such devices which incorporate solid oxide fuel cells (SOFC).

BACKGROUND ART

A SOFC is an electrochemical device that allows the production of direct current electricity (and/or co-generated heat) by the direct electrochemical combination of a fuel (such as hydrogen, natural gas, coal gas, or other hydrocarbon-based fuels, for example) with an oxidant (such as air). A SOFC consists of an oxygen ion conducting electrolyte (currently based on stabilised zirconia) separating an air electrode (cathode) from a fuel electrode (anode). The fuel is oxidised at the anode and electrons are released to an external circuit, where they are accepted by the cathode. The cathode reaction causes the oxidant gas to be reduced to oxygen ions, which then migrate across the oxygen ion-conducting electrolyte to the anode. The movement of electrons around the external circuit produces an electromotive force (typically 1 volt for a single cell). By the application of a load across the cell, current flows, thus producing a power density, the value of which depends upon the design of the cell and the materials used. The cell is typically run at between 700 and 1000° Celcius. The book "Science and Technology of Ceramic Fuel Cells" authors N. Q. Minh and T. Takahashi (Elsevier, Amsterdam, 1995) describes the principle reactions in SOFC, and the methods by which electricity can be produced.

The most attractive features of the SOFC are its high conversion efficiency (typically 50 to 90% if heat utilisation is included), its low production of emissions, its production of high-grade exhaust heat, and its modularisability (from a few kW of electricity to many MW).

Single SOFC cells are usually stacked, using an interconnect or bi-polar plate (usually based on doped lanthanum chromite, or a high temperature metallic system), to produce a multi-cellular unit. The single cell typically produces 1 volt, however by stacking the single cells either in parallel or series connection, the required voltage can be realised. There are several known structures of the SOFC, and these include the planar, tubular and monolithic designs. It should be stressed, however, that in addition to these three main designs, other designs have been sited, although the basic concept remains the same in all designs, that of an oxygen ion conducting electrolyte separating a fuel gas (at the anode) from an oxidising gas (at the cathode). See, for example, the paper "Ceramic Fuel Cells", author N. Q. Minh, pages 563–588, Journal of the American Ceramic Society, 76[3] (1993).

For SOFC systems to become fully realised, and thus fully commercial, they must be reliable over long periods of time, and must not be subjected to thermal cracking due to heating or cooling cycles. The systems must also compete financially with conventional technologies, such as gas turbines and diesel generators, and thus they must be relatively inexpensive and easy to assemble. The major drawbacks of the current designs are principally based on sealing of the single cells. The planar design, using flat plate electrolytes with an anode and cathode adhered to either side, appears to be the cheapest system to fabricate, however its major problem still hinges around the issue of sealing the plates without causing excessive stressing of the ceramic plates, or chemical compatibility issues between the sealant and the cells. The tubular design gets around the problem of sealing by using a closed or open-ended tube. In the conventional tubular design, an extruded porous doped-lanthanum manganite support tube is fabricated. The electrolyte (stabilised zirconia) is electrochemically vapour deposited onto the support tube. The anode is then slurry spray-electrochemical vapour deposited onto the electrolyte, and doped-lanthanum chromite is plasma sprayed onto the cell as an interconnect material. The cells are then bundled into multi-cellular units and then packaged as a SOFC system. The air is pumped into the interior of the tubes, while the exterior of the tube is exposed to the fuel gas. The tubes are sealed at one end, so that spent air can flow back through an annular. The spent fuel can also be recycled to allow for heat recovery.

This tubular arrangement has been very successful, However, the design does not allow for rapid heat cycling, as thermal stresses could occur causing the cells to crack. Even with the improvements that have been undertaken, the current limit on this design requires 5 hours for the system to reach 1000° C. operating temperature from ambient. State-of-the-art generators, using the technology described above, are described in U.S. Pat. No. 5,244,752. These are significant improvements on those SOFC systems sited in U.S. Pat. Nos. 4,374,184, 4,395,468, 4,664,986, 4,729,931, and 4,751,152. The design described above is also expensive to fabricate and is not conducive to producing small-scale systems (sub-10kW). The manufacturers of the systems have reduced the manufacturing costs by reducing the cost of the raw materials. For example, 90% of the weight of the cell is in the doped-lanthanum chromite air electrode, and thus by using a cheaper supply of raw materials (high impurity level), the cost can be reduced substantially. As described in a paper "Recent Progress in Tubular Solid Oxide Fuel Cell Technology", author S. C. Singhal, in Solid Oxide Fuel. Cells Volume V, The Electrochemical Society (New Jersey), pages 37–50 (1997). However, the cost of the system will not allow for small-scale production.

To overcome the problem of high manufacturing cost, the use of extruded thin walled stabilised zirconia tubes is disclosed. See for example Australian Patent 675122. The inner electrode in this design was the fuel electrode, while the outer electrode was the air electrode (usually lanthanum manganite). In the design, tubes were supported within a thermally insulating container from which the exhaust gas can escape through a passageway. In this design, the cost of the tubes has been reduced by using a simple extrusion technique for extruding stabilised zirconia mixed with, for example, polyvinyl butyral and cyclohexane. The design is described as containing an array of the aforementioned tubes, supported within a thermally insulating container from which the combustion products can escape through a passageway. Gas is supplied directly to the top of the tubes. The combustion products escape through the same passageway as the forced air inlet. Although very simple, this design does not allow for the full movement of the cells within the reactor, and it is therefore still liable to stress build up in the cells, which may cause cell damage.

The ability to reform the fuel within the SOFC generator is also not possible in the designs described above. Reforming is a process by which the fuel, in this case usually a hydrocarbon fuel, is combined with water and/or carbon dioxide to produce carbon monoxide and hydrogen. This reformed fuel is then directly used in the SOFC system. In the majority of cases, the fuel is reformed outside the SOFC generator, which requires expensive equipment such as heat exchanges, pumps etc., which also make the whole system a lot more bulky. The reforming reaction, when it takes place outside the generator is highly undesirable as a lot of energy is lost from the system (as heat) and thus causes an overall loss in the efficiency of the system, and an increase in its complexity. This was partially overcome in the U.S. Pat. No. 4,729,9331, where the reforming of a reformable gaseous fuel was performed in the SOFC generator. In this system, the partially spent fuel is divided into two streams; one is combined with the partially spent air stream to form exhaust gas, which is then partially vented. Some of the remaining exhaust gas is then combined with the second spent fuel stream. The combined stream is then mixed with the gaseous reformable fuel. The invention uses the heat balance in the system as a whole to minimise the heat losses. The invention uses the traditional design of the tubular SOFC systems, as described in the U.S. Patents described above, and does not, therefore, overcome the original problems of complexity of system, expense, and the ability to thermally cycle at fast heating and cooling rates. The system is also quite complicated.

An alternative design is described in U.S. Pat. No. 3,377,703. Here, several electrolyte tubes stand upright on a ceramic base. Gas is passed through the tubes and combusted at the top of the tubes. The hot gases then flow around the system to a heat exchanger. Although relatively simple, the system requires a significant number of high temperature seals, and will not allow for high thermal stresses, as may be experienced in rapid start-up.

DISCLOSURE OF THE INVENTION

It is therefore an object of the present invention to provide a power generating apparatus incorporating solid oxide fuel cells which goes some way toward overcoming the above disadvantages or will at least provide the public with a useful choice.

In a first aspect the invention consists in apparatus for generating electrical power comprising:

a plurality of tubular solid oxide fuel cells in a reaction chamber, each said cell having an inwardly facing reaction surface and an outwardly facing reaction surface, and electrodes associated with each said surface, and having one end of the said cell mounted in a manifold block, a first gases inlet path to supply first gases to said reaction chamber, said fist gases to pass along the outside of said fuel cells, a second gases inlet path to supply a second gases to the mounted ends of said fuel cells to pass along the inside of said fuel cells, an exhaust gases outlet path from said reaction chamber adjacent the ends of said fuel cells away from said manifold block, for carrying exhaust gases to an exhaust outlet and in which unreacted gases may combust with one another, and power collection means which connect to said conductors on the insides and outsides of said fuel cells;

one of said first and second gases being reformable fuel gases and the other being oxidising gases, said gases paths thereby each for carrying one of reformable gases and oxidising gases in accordance with the arrangement of the reactive surfaces of said fuel cells, said reformable gases carrying path including a reformation catalyst therein and being arranged in heat transfer relation with said exhaust gases path and said reaction chamber such that in steady state operation the gases therein may be raised to a temperature at said catalyst at which reformation can occur, and said oxidising gases carrying path is arranged in heat transfer relation with said exhaust gases path and said reaction chamber such that in steady state operation the gases therein may be raised to a reaction temperature at said fuel cells at which said fuel cells operate.

Each said tubular fuel cell may have an outside diameter between 3 mm and 10 mm and has a wall thickness of between 0.3 mm and 1 mm.

A variable flow restriction means may be provided in said oxidising gas inlet path to variably restrict the flow of said oxidising gas to said fuel cells and said combustion zone, to thereby control the combustion temperature.

The second gas inlet path may include in part a cylindrical or conical chamber, and said exhaust gases outlet path includes in part a cylindrical or conical chamber concentric with said inlet path and divided therefrom by a wall of a material typically alumina or mullite, or with a thermal impedance less than the thermal impedance of such materials.

The first gas inlet path may include at least in part a cylindrical channel divided from said oxidising gas inlet path by a wall of a material typically alumina or mullite, or with a thermal impedance less than the thermal impedance of such materials.

A baffle wall made divide said reaction chamber from said exhaust gases outlet path, said tubular cells extending through apertures in said baffle wall into said exhaust gases outlet path, and apertures in said baffle wall allowing a flow of partially reactive gases to flow from said reaction chamber to said exhaust gases outlet path to combust with the partially reacted gases flying from the insides of said tubular cells.

Each said tubular fuel cell may be held only at the end thereof mounted in said manifold block.

Each said cell may pass through an aperture in said baffle wall, being spaced clear from the edge of said aperture all around said cell, and said partially reacted gases which flow from said reaction chamber to said exhaust gases outlet path may flow through said apertures, through the space between the wall thereof and the respective said fuel cell.

The first gases inlet path may include a plenum chamber below said manifold block, and said fuel cell mounted ends may extend through said manifold block, said plenum chamber dispersing said gases to said fuel cell mounted ends.

The first gases may be said oxidising gases and said power connection means may connect to said electrodes on said insides and outsides of said fuel cells at the ends thereof disposed within said plenum chamber.

The first gases inlet path may include a thermally conductive gases conduit extending into said plenum chamber through said manifold block, a first length of the conduit passing through said reaction chamber to absorb heat from the gases in said reaction chamber under steady state operating conditions.

A second length of said thermally conductive gases conduit may pass through at least part of said exhaust gases outlet path.

An annular chamber may surround said reaction chamber, with gases inlet port means through which gases flow through said annular chamber and gases outlet port means for gases to flow from said annular chamber into said reaction chamber at the far end of said annular chamber from said inlet port means, said gases outlet port means located adjacent said manifold block, and the wall between said reaction chamber and said annular chamber being thermally conductive, for example being formed from alumina or mullite or having a similar thermal impedance to those materials.

One or more mixing ports may be provided in said wall between the annular chamber and the reaction chamber, the ports leading between the chambers at the far end of the reaction chamber from the gases outlet port means, and a suction generation means be provided to create a low pressure zone in the annular chamber immediately adjacent the mixing ports under the action of gases which pass through the annular chamber to draw gases through the mixing ports from the reaction chamber into the annular chamber. Such suction generation means may comprise some form of venturi.

The fuel cells may be based on a yttria stabilised zirconia electrolyte, mounted in a glass ceramic insulator (such as that sold under the MACOR brand by Corning Glassworks), and the manifold block be manufactured from ferritic stainless steel.

An ignition means may be provided within the combustion zone to generate a localised heat sufficient to ignite said fuel gas in the presence of said oxidising gas.

Control means may control said ignition means and the flow of said fuel gases to cause said fuel gases to flow at a substantially higher rate during start up than that required for power generation, ignite said gas flow and maintain said gas flow at said substantially high rate until a temperature of approximately 800° C. is reached at said manifold block.

For commonly available SOFC compositions the reaction temperature would be between 400° C. and 600° C. For a standard reforming reaction with commonly used nickel catalyst the reforming temperature would be between 600° C. and 800° C.

In a further aspect the invention consists in a space heater including power generating apparatus as described above, and wherein said exhaust gases are utilised for space heating and said generated power is distributed for other applications.

In a yet further aspect the invention consists in a water heating cylinder incorporating a power generation apparatus as described above, and wherein said exhaust gases are used for heating a supply of water in said water heating cylinder and said generated power is distributed for other applications.

In a still further aspect the invention consists in power generating apparatus substantially as herein described with reference to and as illustrated by the accompanying drawings.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

Preferred embodiments of the present invention will now be described with reference to the accompanying drawings in which.

BEST MODES FOR CARRYING OUT THE INVENTION

Figure 1:
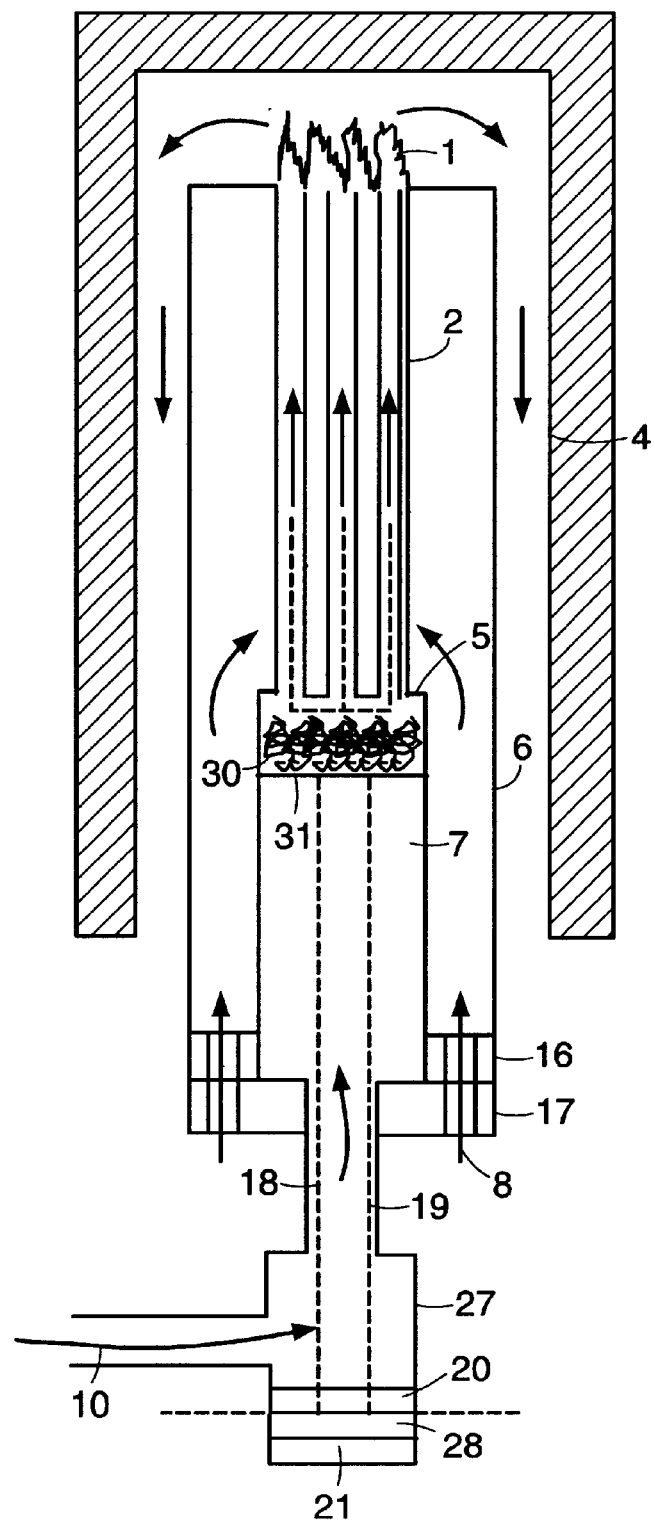
FIG. 1 is a cross sectional side elevation, in partial schematic form, through a power generating apparatus according to one embodiment of the present invention.

With reference to FIG. 1 a plurality of tubular fuel cells 2 generate electricity as fuel passes through the inside and air passes along the outside thereof. Cells of this kind are known in the art, and cells such as those described in "An SOFC Cogeneration System Built From 2 mm Diameter Extruded Tubes",(K Kendall, T W J Longstaff, Second European Solid Oxide Fuel Cell Forum, Lucerne, Switzerland, (May 6–10 1996) p195) are particularly suitable. The cells are mounted on a base plate 5, which forms the top of a reforming chamber 7. In the reforming chamber a reforming catalyst is present, suitable for the conversion of carbon containing fuels into a hydrogen rich mixture.

Air is entering the system through perforated rings 16,17, mounted on the outside of the chamber, passes the cells, and at the ends of the cells is combusted with depleted fuel, leaving the tubes.

The air is brought to the required operating temperature by picking up heat from a heat exchange system, comprising concentric pipes 4 and 6. Part of the heat is transferred to the reforming chamber 7.

The inner tube 6 of the heat exchange system is open ended, the outer tube 4 has one dead end. The dead end is placed over the burner and consequently the flue gas is forced to pass the space between the pipes and therefore heats up the pipes. The majority of the transferred heat will pass through the inner tube, as the outer tube is thermally insulated.

Start-up, Shut-down and Control of the Power Generating Apparatus.

The system is started at ambient temperature, by opening a gas valve and igniting the gas that passes the tubes. This can be done with a conventional ignition system mounted in the outer pipe. The gas flow may be 5 to 10 times higher than the nominal gas flow, required during electricity production. Consequently a system with a rated electrical power of 1 kW may see 10–20 kW of heat entering the system during start-up. Such a system will contain some 10 kg of stainless steel, and consequently heating up to the operating temperature should require less than one minute. Once a temperature of approximately 800° C. has been reached, measured at the base plate, then the start-up phase has finished.

The system is now set to idle, by adjusting the gas flow to a minimum that will just keep the system at temperature. This flow will be 10–30% of the nominal flow. As soon as current is drawn, which can be detected by, for instance measuring a change in magnetic field, the flow is set to full and current can be drawn.

Process temperature is controlled by allowing more or less air in, by mechanically controlling the resistance to flow of air entering the system, by rotating ring 17 respective to ring 16.

It is envisaged that the control described above can be carried out with a conventional burner control system, possibly with some added functionality.

The advantage of using these is the reliability and low cost, as opposed to a system that can continuously vary the gas supply in relation to the demanded current. A disadvantage is that at low power most of the gas is burned and thus system efficiency is low. Whether variable or fixed (or a number of fixed stages) gas flows will be used, depends on the application.

Shut-down will require that the current is set to zero and that gas is supplied at idle flow until a temperature of about 300° C. is reached, below which the gas supply can be stopped.

A possible fault situation is that the voltage is too low, for instance because the gas supply is too low, resulting in oxidation of the anode. This situation has to be detected by a voltage measurement, which should trigger the current to be zeroed, and the gas flow to go to idle.

System Dimensions

The overall system has a diameter of approximately 40 cm (allowing 5 cm for insulation) and approximately 80 cm high, and houses around 800 cells, each producing 1.5 W, when running on hydrogen. Thus 1.2 kW of electrical energy is produced at an efficiency of 45% (LHV), whereby heat is generated at a temperature of over 500° C., which can be recovered. The recovered heat may be used for other applications requiring lower quality heat, such as space heating and water heating. In some instances the space or water heating capacity may be the primary purpose with the power generation a secondary factor.

The Tubular Cells

Figure 2:
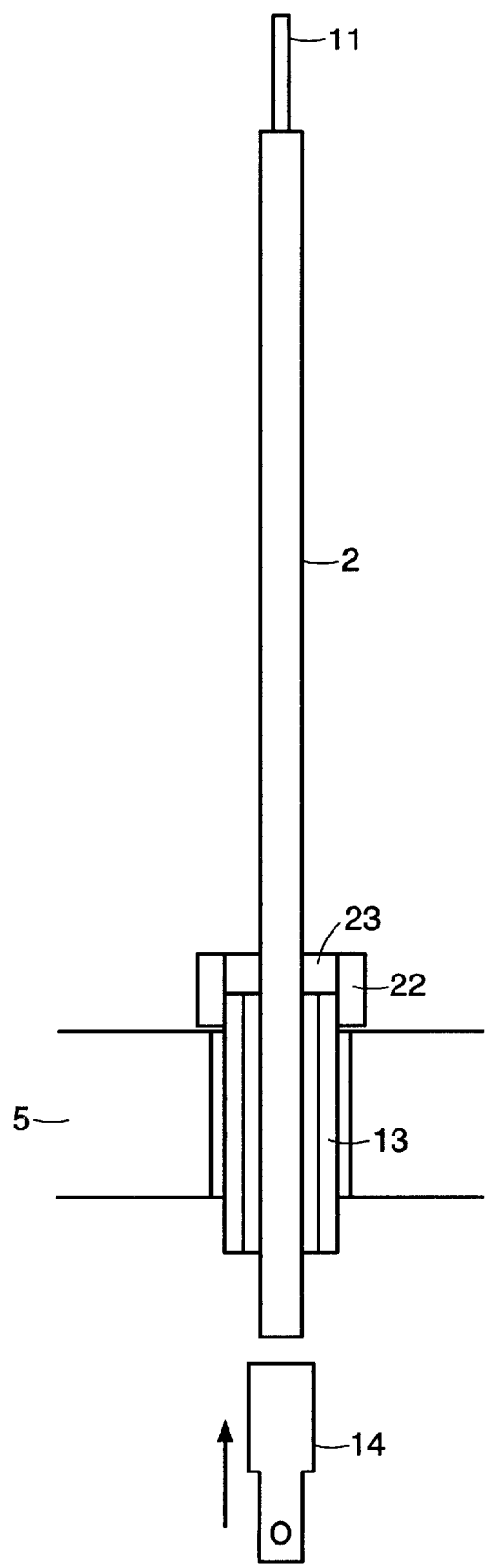
FIG. 2 is a cross sectional side elevation of a mounted fuel cell according to a preferred embodiment of the present invention.
Figure 3:
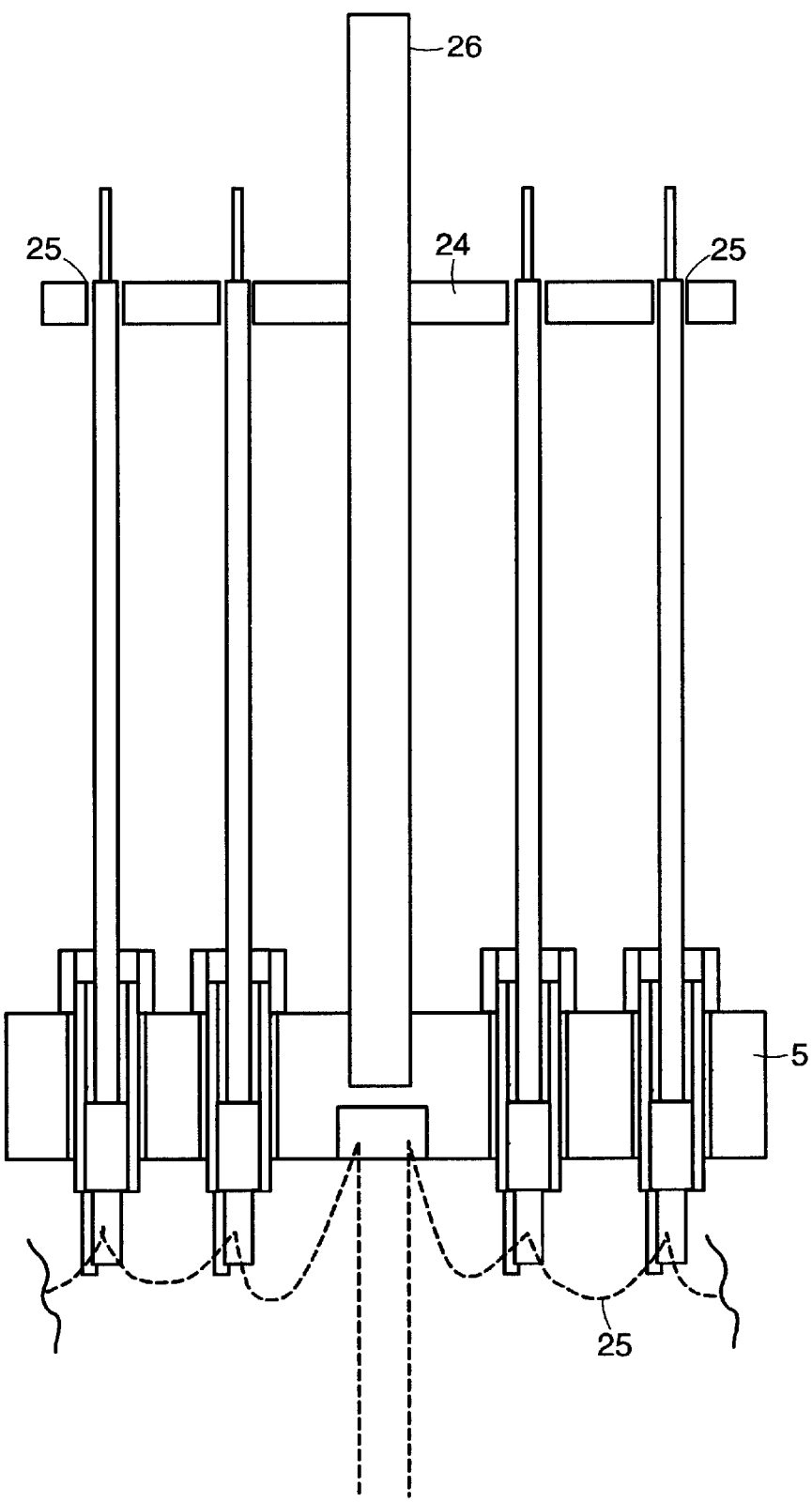
FIG. 3 is a cross sectional side elevation of a plurality of mounted fuel cells and their associated support structures according to one embodiment of the present invention.

The cells 2, as designated in FIGS. 1, 2 and 3 consist of three layers. The cells have a diameter of typically 1–5 mm and a length of up to 500 mm. A larger system might include cells of up to 1000 mm. The outer layer, the cathode, is in contact with an oxygen containing gas, such as air. Oxygen reacts in this layer to an oxygen ion by picking up electrons. The oxygen ion migrates through the middle layer, being the electrolyte. This transfer takes place at a temperature of 600–1000° C., depending on the electrolyte material, and consequently this determines the operating temperature. When it arrives at the inner layer, the anode, it reacts with the fuel (e.g. hydrogen) to form water. The hydrogen gives up an electron which passes through the electrical circuit to the cathode.

The anode is porous, because it has to be permeable to gases, it can be made of nickel, mixed with the electrolyte. The electrolyte is an oxygen ion conducting material, such as zirconia, stabilised with yttria. It has to be sufficiently dense to prevent passage of gaseous components. The cathode forms the outer layer, is also porous and can be made of a ceramic such as doped-$LaMnO_3$.

The electrolyte tube is made by making a paste of the electrolyte material with binders and plasticisers. The paste is extruded into tube, and then sintered.

Anode and cathode material containing slurries are made and are put on the inside, and outside of the electrolyte, respectively. The anode slurry is applied by suction, the cathode is pasted or sprayed on. Then the electrodes are sintered.

Instead of using zirconia, other ion conductors can be applied. Typical materials would include, doped-$CeO_2$, doped-perovskites, for example.

Alternative electrodes are, for the anode, ceria (and other catalytic metals), and conducting ceramic oxide materials, such as perovskites. For the cathode, $LaCoO_2$, is a possible example. The electrochemical activity of these materials is thought to be higher than the conventional electrode materials described above, especially at lower temperatures.

An alternative way of producing cells is by first extruding and sintering a tube of anode material. Onto this tube a thin layer of electrolyte is applied, the contact area of which, with the anode, can be increased by applying suction to the anode tube. This is sintered and subsequently the cathode is applied and sintered.

The advantage of this method is that thinner electrolytes become feasible, reducing internal resistance, and thicker anodes can be used, increasing reforming capacity of the anode.

Current Pick-up

The electrons enter the cathode by passing the connector 14 and an electrically conducting layer, which is on the cathode. The connector 14 is placed around the inlet end of the tubular cell, it is made of, for instance, nickel sheet.

The electrically conducting layer (not shown) is, for instance, a silver wire or silver paste. Of course, any conductor with sufficient conductivity can be employed.

The connector 14 is made of sheet metal with a thickness of 0.2–0.3 mm, cut into a rectangle of about 8 by 8 mm, with a lip of 3 by 8 mm, approximately. It is folded around a rod, with the same diameter as the tubular cell, and mounted on the ceramic tube. A small hole in the lip provides the connection with the anode wire of an adjacent cell. The end of the lip is preferred to be at a level with the end of the cell, thus short circuiting is prevented.

The electrons produced at the anode are passed to a current collector, for instance made of nickel, consisting of a number of wires twisted around each other. By twisting wires, electrical contact is ensured, but also space for gas to pass remains.

Sealing

Mounting each fuel cell in the manifold plate 5, which will generally be of a conductive material such as stainless steel, involves fitting the tubular fuel cell with an annular insulator. A sealing contact is preferred between the fuel cell and the insulator and also between the insulator and the manifold plate 51. A manufacturing process has been developed which achieves this purpose and which is described with reference to FIG. 2.

A ceramic ring 22, is temporarily glued onto a ceramic insulator 13. The ceramic insulator sits around the cells and just fits around the connector 14. It has a length of approximately 25 mm. The length of the ring will be around 4 mm and will just fit around the ceramic tube. The ring is only on the insulator for half its length, and thus when the cell is placed, a small basin 23 is formed into which cement can be put. The cement comes as a slurry, and therefore by applying suction to the other end of the insulator, cement comes in between the tubular cell and the insulator. Afterwards, the basin is filled with cement and thus a good seal between the tubular cell 2 and the insulator 13 is created.

The cell assembly is cemented to a base plate, in a manner similar to the process described above; after placing the cells, cement is poured over the base plate and suction is applied.

To increase the contact area of the cement with the base plate, it is threaded to a standard size thread. The cements being used are commercially available alumina, zirconia and magnesia cements.

The material of the base plate can be a high grade stainless steel, preferably a ferritic type, because it has a low expansion coefficient, and is therefore less likely to give problems resulting from a mismatch of expansion coefficients.

The cells are thus mounted to the base plate 5, which are groupwise connected in parallel and groups are connected in series.

Figure 4:
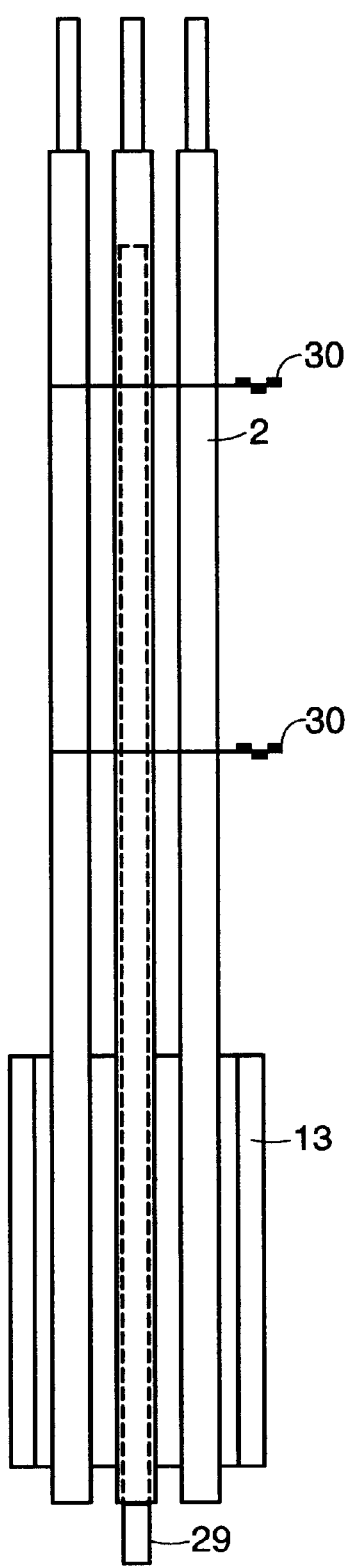
FIG. 4 is a cross sectional side elevation of a plurality of fuel cells mounted as a bundle according to another embodiment of the present invention.

To increase the number of cells per area and also overall reliability, cells can be bundled. This is shown in FIG. 4. A number of cells are placed around a metal rod 29, which serves as a current pick-up. This assembly is cemented into a ceramic insulator, similar to that seen in a single cell, which is placed into a base plate. Tubes are held against the rod by a wire 30.

It is preferred that the ceramic insulator 13 and the manifold plate 5 be formed from materials having similar coefficient of thermal expansion to the electrolyte material of the fuel cells to reduce the stresses generated therebetween during heating or cooling. For the fuel cells. as described earlier, ceramic insulators made from glass ceramic materials such as the machinable glass ceramic sold under the brand MACOR produced by Corning Glassworks, and a manifold plate formed from ferritic stainless steel coated with an alumina diffusion layer using a pack cementation technique have been found appropriate.

The Burner

To the top of the cell a small hollow ceramic tube 11 is cemented, the material which can be alumina. The inside diameter is so that the gas velocity is high enough to keep the gas flame outside of the tube, usually around 0.5 mm.

The system is made more resilient to external mechanical impact by placing a perforated plate with holes 24, coinciding with the holes of the base plate, at the end of the cells. This plate is held in position by a rod 26, that is screwed into the base plate. To prevent short circuiting the holes are provided with an alumina tube 25, cemented onto the burner plate 1. Small slots in the inside of the alumina tubes allow air to pass. Thus the tubular cells are free to expand in the axial direction, but are limited in movement in radial direction, preventing breakage resulting from mechanical impact.

The Reforming Chamber

The base plate with cells and leads is mounted to a pipe, to form a chamber 7, inside of which reforming can take place, allowing the system to run on a reformable fuel mixture such as natural gas or methane and steam. The reforming chamber includes a reforming catalyst such as nickel wool. The reforming chamber into which the reformable fuel mixture is supplied is sufficiently heated by heat exchange from the exhaust gases to raise the fuel mixture temperature to a sufficient level for reforming to take place, such as 800° C. It has to be ensured that the reforming catalyst is placed in a sufficiently hot zone of the chamber, as to prevent soot formation of the fuel. To this end the catalyst 30 may be placed on a perforated plate 31, mounted a few centinetres below the base plate 5. Alternatively the catalyst may be disposed within the tubes 2 themselves, in which case the reformable fuel mixture must fully reach the reforming temperature before entering the tubes to ensure that incomplete reforming, or soot formation on the tube surfaces does not occur.

Gas Connection and Electricity Feed Through

The positive and negative leads of the connected cells, are connected to the outside world by an electrically insulating and gas tight feed through block. The component essentially consists of a lengthways bored through steel rod 27 of a few centimetres long. Gas is supplied through a bore at the side of the rod, and the wires 18,19 are passed straight through. The wires pass through holes in a PTFE (or similar) ring 20, at the bottom of the rod, and then bend sideways. A second PTFE (or similar) plate 28 is placed, and a metal ring 21 is placed. Metal and PTFE (or similar) plates are screwed onto the steel rod, thus providing a gas tight seal.

Air flow control

Oxygen (air) enters the system through holes in rings 16,17, placed around the gas chamber. The incoming air picks-up heat from the hot gas that passes between the inner pipe 6 and the outer pipe 4, and transfers part of the heat to the fuel gas in the reformer chamber.

To control the air supply, one of the rings 17 can rotate. By rotating the ring 17, more or less air is allowed into the system. Controlling the air supply is required to control the temperature of the flame, and thus the process.

The System

The electrochemical reactor that produces the electricity consists of an array of tubular fuel cells 2, mounted at one end on a base plate 5 and are electrically connected.

The base plate 5 serves as a manifold for the file gas. As only one end of the cells is held, thermally induced stresses are avoided. The base plate is mounted at one end of a pipe, the inside of which may contain a reforming catalyst. The other end of the pipe is connected to a tube that feeds the reformable fuel mixture into the system. Thus a reforming chamber 7 is formed.

Accordingly, the fuel gas passes through the inside of the tubes, and air passes along the outside. At a temperature of typically 600–1000° C., the gases are converted, thereby producing electricity. The electricity is passed to one end of the cells through electrically conducting wires or inks on the electrodes. Typically, cells will be connected electrically in series at the bottom (the fuel side) of the base plate. Because the electrical connections between the cells are made at the fuel side of the base plate, the main electrical leads will have to pass the walls containing the fuel. This is done with a feed through block, as described above.

The fuel gas, entering as indicated by arrow 10 and manifolded to the inside of the cells, is converted for typically 50–90% upon passing the cells. Thus at the end of the tubes a depleted fuel will be present. Ambient air 8 can access the system through convection through the holes in the rings 16 and 17. By burning the depleted fuel, the air is forced into the system, and upon passing the cells, part of the oxygen is removed. Thus, the burner is supplied with air, depleted with oxygen. The air also has a function in controlling the temperature of the system. Typically, the air flow has to be 5–10 times higher than the fuel flow, in order to prevent an excessive temperature difference along the length of the cells.

A heat exchange system, consisting of two concentrically placed pipes, feeds the heat, generated by the burner, back to the system inlet. The outer pipe 4 has one dead end, the inner pipe 6 has two open ends. The inner pipe extends from about the bottom of the reforming chamber, to the ends of the tubes. As a result of the burning process, air is forced in between the reforming chamber and the inner pipe. The air passes the cells, and part of the oxygen is converted, through the electrochemical process. This air, partly depleted of oxygen, is burned together with the depleted fuel gas. The resulting heat cannot rise up, because of the dead end of the outer tube, and therefore moves down along the outside of the inner pipe, thereby transferring heat to the inner pipe and subsequently to the incoming air.

Figure 5:
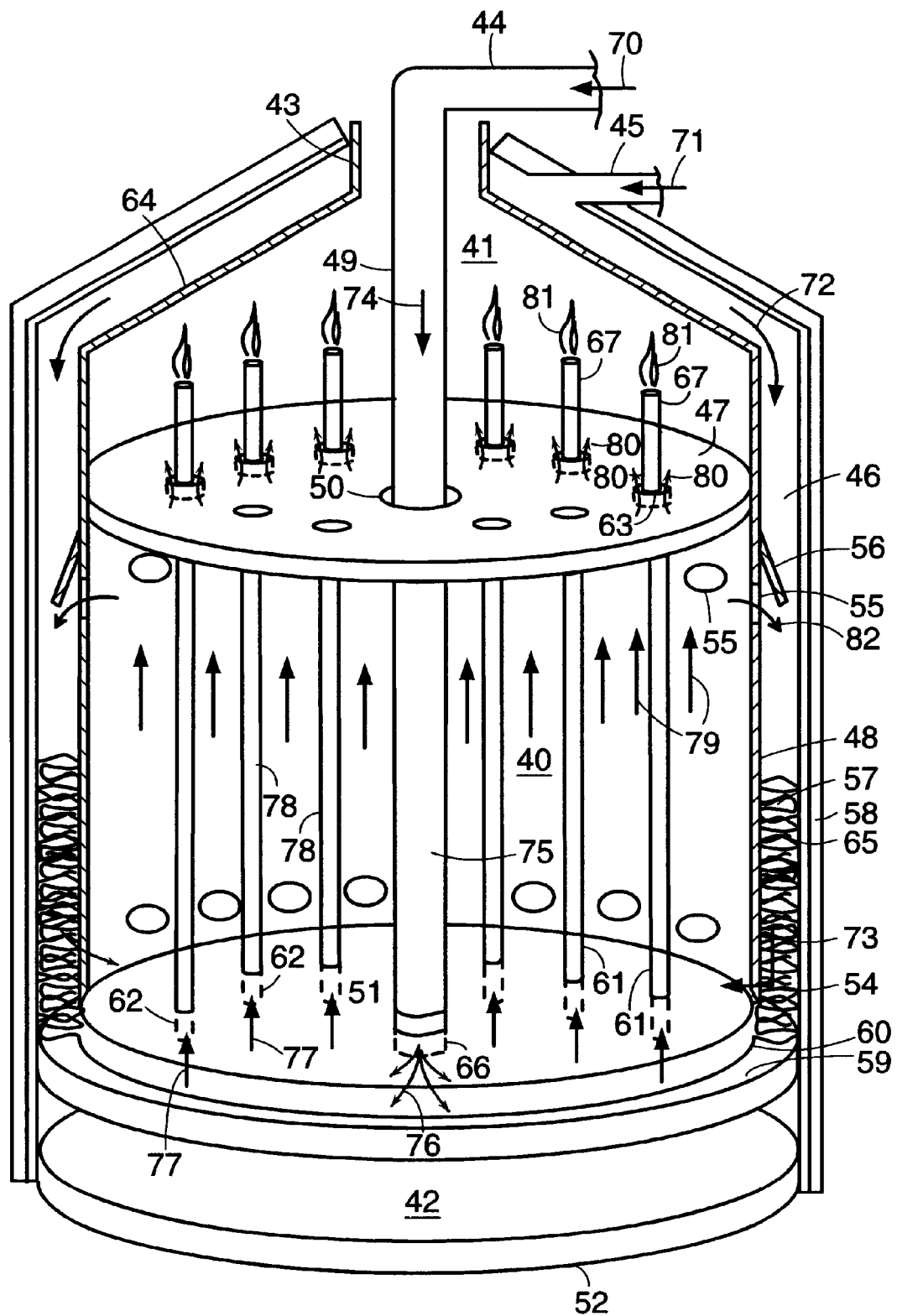
FIG. 5 is a cross sectional side view in partial schematic form of a power generating apparatus according to a preferred embodiment of the invention.

Alternative System of FIG. 5

A system believed to offer performance superior to that of the system described above is depicted in FIG. 5. This embodiment offers potentially superior heat exchange by containment of the reaction chamber 40 and the combustion chamber 41 within a highly heat conductive wall 48 which is surrounded by an annular space 46 serving as the inlet path for one of the reaction gases, (in the embodiment depicted, the fuel gas).

In some detail, the apparatus has a reaction chamber 40 bounded around its sides by the heat conductive wall 48, which may be for example alumina or mullite, a manifold block 51 at the lower end of the reaction chamber and a baffle plate 47 bounding the upper end of the reaction chamber. As with the embodiment of FIG. 1 fuel cells 61 are each mounted at one end 62 thereof in the manifold block 51. The fuel cells 61 extend vertically through the reaction chamber 40 and through apertures 63 in the baffle plate 47. The apertures 63 are of greater diameter than the tubular fuel cells 61, providing an annular gap around each fuel cell. The ends 67 of the fuel cells 61 extend beyond the baffle 47 into a combustion chamber 41 which forms part of the outlet path for exhaust gases. It will be appreciated that in FIG. 5 only a small number of fuel cells are shown to ensure clarity of the diagram. In a full blown system many hundred fuel cells may be provided.

The combustion chamber 41 is bounded below by the baffle plate 47, and around the sides and over a substantial portion of the top area thereof by the heat conductive wall 48 and a conical extension thereof which forms a heat conductive roof 64. The combustion chamber 41 has an outlet 43 therefrom. A gas inlet pipe 49 extends through the exhaust outlet 43, downward through the combustion chamber 41, through an aperture 50 in the baffle plate 47, through the reaction chamber 40 and through the manifold block 51. Although the exhaust outlet 43 is shown in truncated form in FIG. 5, for improved heat exchange between exhausting gases and the inlet pipe 49 the exhaust outlet 43 and inner pipe 49 may run in a concentric configuration for larger distances as required.

The inlet pipe 49 extends into or through the manifold block 51 to have an outlet in a plenum chamber 42 below the manifold block 51. The plenum chamber 42 is enclosed below by a bottom plate 52 and at the sides thereof by outer wall 57.

The lower edge 60 of the heat conductive wall 48 is located on the manifold block 51 by an annular step 59 formed therein. An outer wall 57 is concentric with and spaced from the heat conductive wall 48 to form an annular chamber 46 which surrounds the reaction chamber 40 and combustion chamber 41. The outer wall 57 is sealed against the perimeter of the manifold block 51 and the bottom plate 52. The wall 57 may comprise, for example, a stainless steel sheeting, and the outer wall of the apparatus is preferably provided with a layer of insulation 58 around the outside thereof.

The annular chamber 46 provides the major part of the inlet path for the second reaction gas which enters through an inlet 45 close to the exhaust outlet 43. The annular chamber 46 has one or more outlet ports 54 at the lower end thereof, adjacent the manifold block 51. To assist in raising inlet gases to the necessary temperatures, further heat exchange is provided by recirculating a small amount of the gases in the reaction chamber out through outlet ports 55 therefrom, back into the annular passage 46. To aid the drawing of gases through the outlet ports 55 an angled flange 56 may be provided in the vicinity of the ports 55 as a venturi, to create a low pressure zone immediately adjacent each of the ports 55.

The recirculated depleted fuel gases also allow a partial oxidation reforming reaction to be used, which does not require water to be present in the fuel gases stream.

In the embodiment of the invention shown in FIG. 5 it is conceivable that either inlet path could be used for either oxidising gases or fuel gases, with the reforming catalyst being located either in the lower end of the annular chamber 46 or in the plenum chamber 42 as appropriate. As we will be describing the operation of this embodiment with fuel gases entering at inlet 45 and travelling through the annular chamber 46, and oxidising gases entering at the inlet 44 of the inlet tube 49 and being distributed through the plenum chamber, the reforming catalyst 65 is shown located in the lower portion of the annular chamber 46.

In operation of the apparatus fuel gas is supplied as indicated by arrow 71 at the inlet 45. The supply of fuel gas is preferably controlled by a system controller, adjusting the fuel gas pressure using conventional means. Oxidising gases are supplied as indicated by arrow 70 at the inlet 44 of the inlet tube 49. Supply of oxidising gases may also be controlled by the system controller, for example, by providing a variable restriction on the inlet pipe. Under some conditions prepressurisation of the oxidising gases may be required and could be accomplished for example by a small fan.

The fuel gases travel in the path indicated by arrows 72, over the heat conductive roof 64 of the combustion chamber 41 and into the annular chamber 46 surrounding the heat conductive wall 48. The fuel gases are heated by their passing over the heat conductive wall which is heated from within by combustion in the combustion chamber 41, and the hot gases in the reaction chamber 40, heated by the exothermic fuel conversion process.

The inlet fuel gases are further heated by mixing with a small quantity of depleted fuel gases exiting the reaction chamber through outlet ports 55 as indicated by arrows 82. The fuel gases are thus raised during steady state operation of the apparatus to a temperature of approximately 800° C. before reaching the reforming catalyst 65 where reforming takes place as the gases flow therethrough.

The reformed fuel gases then flow into the reaction chamber through ports 54 in the manner indicated by arrows 73. The reformed fuel gases pass upwards through the reaction chamber, passing over the outside of the fuel cells, as indicated by arrows 79, and exit the reaction chamber either through the outlet ports 55 and back into the annular chamber 56, or through the gap provided between the apertures 63 and the baffle plate 47 and the fuel cells 61 which pass therethrough. Fuel gas may also exit into the combustion chamber 41 through an annular gap provided between aperture 50 and inlet pipe 49 if such a gap exists. The existence of this gap will depend on which materials are chosen for the inlet pipe 49 and the baffle plate 47 and whether the coefficient of thermal expansion will allow a close tolerance fitting.

The oxidising gases enter as indicated by arrow 70 through the inlet 44 of inlet pipe 49, and pass downward through the inlet pipe as indicated by arrows 74 and 75 to the outlet 66 at the lower end thereof, exiting into the plenum chamber 42, and being dispersed therein as indicated by arrows 76. The plenum chamber provides a substantially uniform supply of air to the ends 62 of fuel cells 61 which open therein. Oxidising gases pass into the open ends 62 of the fuel cells 61 as indicated by arrows 77 to pass up the inside thereof as indicated by arrows 78.

In the embodiment depicted in FIG. 5 the anodes and cathodes of the fuel cells are reversed as compared to the embodiment depicted in FIG. 1. The cathode is formed on the inner surface of the electrolyte tube and the anode is formed on the outer surface of the electrolyte tube. The oxidising gases passing up the inside of the tube and the fuel gases present around the outside of the tube react as previously described to create a potential between the inside and outside electrical conducting layers of the fuel cells. Electrical connections to these electrical conducting layers are preferably made at the lower end 62 of the cells 61 in the plenum chamber 42 which, being absent of fuel gases, and in normal use containing only heated air, is a reasonably hospitable environment.

The depleted oxidising gases pass out of the upper ends 67 of the fuel cells 61 into the combustion chamber 41, where they combust, for example as plumes 81 with the depleted fuel gases which have passed through apertures 63 as indicated by arrows 80. The combustion provides extra heating of the heat conductive roof 64 and of the inlet tube 49 and therefore of the fuel gases and oxidizing gases being introduced to the system. Depleted and combusted exhaust gases then pass out of the apparatus through the exhaust outlet 43.

It is apparent that the configuration of FIG. 5 provides significantly greater heat transfer opportunities than the system of FIG. 1 with the heat producing areas, the reaction chamber 40 and the combustion chamber 41, being contained within the fuel gases inlet chamber 46, and the oxidising gases inlet pipe extracting excess heat from the exhaust gases in the exhaust outlet 43. The system also provides for the electrical connection to the fuel cells to be in a benign area of the apparatus, in the air plenum chamber under the manifold plate 51. From an assembly viewpoint the apparatus is relatively simple to construct with an outer shell 57, 58 which fits and locates over the heat conductive wall 48, 64, the manifold plate 51 and the base plate 52. A relatively straightforward ceramic ring seal is sufficient to seal these connections. The heat conductive wall 48, 64 locates easily over the step 59 of the manifold plate 51, and holds the baffle plate 47 in position. The manifold plate 51, with fuel cells 61 and inlet tube 49 may be preassembled substantially as already described.

Advantages Over Prior Art

The designs overcome many of the problems associated with planar fuel cell designs because:

the interconnect of the planar design constitutes 80–90% of the volume of the stack, however it does not contribute to the generation of power in a direct sense, the interconnect, when using metals, has a greater thermal expansion coefficient than the ceramic material of the cells. This leads to cracking of the ceramic. As a consequence, heating up to the process temperature has to be done slowly; it requires at least 6 hours, which is impractical sealing problems appear to be difficult to overcome in the planar design, repeated starts and stops deteriorate the seals, sealing and contact resistance requirements demand that a holding force is applied of around 100 N/cm$^2$. At the required operating temperature this stress gives rise to problems resulting from creep, to apply the holding force a large frame and extra components are required The newly conceived design overcomes most of these problems, because the cells are being held at only one end, and are therefore free to expand. Moreover, the entire system is integrated into a single piece of equipment, the main features of which are:

air supply does not require a gas blower or pump, but natural convection is used to displace the air, the required process temperature is reached and maintained, by feeding the heat from burnt excess fuel to the air inlet, Present state-of-the-art technology of fuel cells requires that the fuel has a high hydrogen content, and a relatively small amount of hydrocarbon. At the electrode surface the kinetics of the conversion of these gases, into hydrogen, is not high enough, and therefore, a pre-reforming step is required. In the present design a reforming catalyst is be placed in the fuel chamber underneath the fuel cells, with the reformable fuel mixture preheated by the exhaust gases.

In this manner, a large part of what is usually called "balance of plant", has been integrated into the fuel cell stack. This is an accomplishment that significantly reduces the cost of the system as a whole.

What is claimed is:

1. Apparatus for generating electrical power comprising:

a plurality of tubular open ended solid oxide fuel cells in a reaction chamber, each said cell having an inwardly facing reaction surface and an outwardly facing reaction surface, and electrodes associated with each said surface, and having one end of the said cell mounted in a manifold block, a first gases inlet path to supply first gases to said reaction chamber, said first gases to pass along the outside of said fuel cells, a second gases inlet path to supply a second gases to the mounted ends of said fuel cells to pass into the mounted said open end and along the inside of said fuel cells, an exhaust gases outlet path from said reaction chamber adjacent the other said open ends of said fuel cells away from said manifold block, for carrying exhaust gases to an exhaust outlet and for combusting unreacted gases with one another, and power collection means which connect to said electrodes on the insides and outsides of said fuel cells;

one of said first and second gases being reformable fuel gases and the other being oxidizing gases, said gases paths thereby each for carrying one of reformable gases and oxidizing gases in accordance with the arrangement of the reaction surfaces of said fuel cells, said reformable gases carrying path including a reformation catalyst therein and being arranged in heat transfer relation with said exhaust gases path and said reaction chamber such that in steady state operation the gases therein are raised to a temperature at said catalyst at which reformation occurs, and said oxidizing gases carrying path is arranged in heat transfer relation with said exhaust gases path and said reaction chamber such that in steady state operation the gases therein are raised to a reaction temperature at said fuel cells at which said fuel cells operate.

2. Apparatus for generating electrical power as claimed in claim 1 wherein a baffle wall divides said reaction chamber from said exhaust gases outlet path, said tubular cells extend through apertures in said baffle wall into said exhaust gases outlet path, and apertures in said baffle wall allow a flow of partially reacted gases to flow from said reaction chamber to said exhaust gases outlet path to combust with the partially reacted gases flowing from the insides of said tubular fuel cells.

3. Apparatus for generating electrical power as claimed in claim 1 wherein each said tubular fuel cell is held only at the end thereof mounted in said manifold block.

4. Apparatus for generating electrical power as claimed in claim 2 wherein each said tubular fuel cell is held only at the end thereof mounted in said manifold block, each said cell passes through a said aperture in said baffle wall and is spaced clear from the edge of said aperture all around said cell, and said partially reacted gases which flow from said reaction chamber to said exhaust gases outlet path flow through said apertures, through the space between the wall thereof and the respective said fuel cell.

5. Apparatus for generating electrical power as claimed in claim 1 wherein said first gases inlet path includes a plenum chamber below said manifold block for dispersing said gases to said fuel cell mounted ends, and wherein said fuel cell mounted ends extend through said manifold block.

6. Apparatus for generating electrical power as claimed in claim 5 wherein said first gases are said oxidizing gases and wherein said power connection means connect to said electrodes of said insides and outsides of said fuel cells at the ends thereof disposed within said plenum chamber.

7. Apparatus for generating electrical power as claimed in claim 5 wherein said first gases inlet path includes a thermally conductive gases conduit extending into said plenum chamber through said manifold block, a first length thereof passing through said reaction chamber to absorb heat from the gases in said reaction chamber under steady state operating conditions.

8. Apparatus for generating electrical power as claimed in claim 7 wherein said thermally conductive gases conduit includes a second length passing through at least a part of said exhaust gases outlet path.

9. Apparatus for generating electrical power as claimed in claim 1 wherein said second gases inlet path includes an annular chamber surrounding said reaction chamber, gases inlet port means to said annular chamber, and gases outlet port means from said annular chamber into said reaction chamber, said gases outlet port means located adjacent said manifold block, and a wall between said reaction chamber and said annular chamber being thermally conductive.

10. Apparatus for generating electrical power as claimed in claim 9 including one or more mixing ports in said wall between said reaction chamber and said annular chamber, said ports leading between said reaction chamber and said annular chamber at the far end of said reaction chamber from said gases outlet port means, said mixing ports having suction generation means for creating a low pressure zone in said annular chamber immediately adjacent said mixing ports under the action of gases passing there past, to thereby draw gases through said mixing ports from said reaction chamber into said annular chamber.

11. Apparatus for generating electrical power as claimed in claim 1 wherein the mounted end of each said fuel cell is mounted inside a tubular ceramic insulator, the ceramic insulator being cemented within an aperture through said manifold block.

12. Apparatus for generating electrical power as claimed in claim 11 wherein said fuel cells include an electrolyte comprising yttria stabilized zirconia, said insulator is a glass ceramic material and said manifold block is a ferritic stainless steel.

13. Apparatus for generating electrical power as claimed in claim 2 including ignition means for igniting the flow of partially reacted gases from the reaction chamber in the presence of the partially reacted gases flowing from the insides of the tubular fuel cells.

14. Apparatus for generating electrical power as claimed in claim 13 including system control means which control said ignition means and at least the flow of said fuel gases, and are configured to, during startup, cause said fuel gases to flow at a substantially higher rate than required for power generation, ignite said gas flow, and maintain said gas flow at said substantially higher rate until a temperature of approximately 800° C. is reached at said manifold block.

15. A space heater that includes an apparatus for generating electrical power, the space heater comprising:
   a plurality of tubular open ended solid oxide fuel cells in a reaction chamber, each said cell having an inwardly facing reaction surface and an outwardly facing reaction surface, and electrodes associated with each said surface, and having one end of the said cell mounted in a manifold block,
   a first gases inlet path to supply first gases to said reaction chamber, said first gases to pass along the outside of said fuel cells,
   a second gases inlet path to supply a second gases to the mounted ends of said fuel cells to pass into the mounted said open end and along the inside of said fuel cells,
   an exhaust gases outlet path from said reaction chamber adjacent the other said open ends of said fuel cells away from said manifold block, for carrying exhaust gases to an exhaust outlet and for combusting unreacted gases with one another, and
   power collection means which connect to said electrodes on the insides and outsides of said fuel cells;
   one of said first and second gases being reformable fuel gases and the other being oxidizing gases, said gases paths thereby each for carrying one of reformable gases and oxidizing gases in accordance with the arrangement of the reaction surfaces of said fuel cells,
   said reformable gases carrying path including a reformation catalyst therein and being arranged in heat transfer relation with said exhaust gases path and said reaction chamber such that in steady state operation the gases therein are raised to a temperature at said catalyst at which reformation occurs, and
   said oxidizing gases carrying path is arranged in heat transfer relation with said exhaust gases path and said reaction chamber such that in steady state operation the gases therein are raised to a reaction temperature at said fuel cells at which said fuel cells operate;
   wherein said exhaust gases are utilized for space heating, and wherein the fuel cells of the space heater generate electrical power in addition to producing said exhaust gases for space heating.

16. Apparatus for generating electrical power as claimed in claim 2 wherein said first gases inlet path includes a plenum chamber below said manifold block for dispersing said gases to said fuel cell mounted ends, and wherein said fuel cell mounted ends extend through said manifold block.

17. Apparatus for generating electrical power as claimed in claim 2, wherein said second gases inlet path includes an annular chamber surrounding said reaction chamber, gases inlet port means to said annular chamber, and gases outlet port means from said annular chamber into said reaction chamber, said gases outlet port means located adjacent said manifold block, and a wall between said reaction chamber and said annular chamber being thermally conductive.

18. Apparatus for generating electrical power as claimed in claim 5, wherein said second gases inlet path includes an annular chamber surrounding said reaction chamber, gases inlet port means to said annular chamber, and gases outlet port means from said annular chamber into said reaction chamber, said gases outlet port means located adjacent said manifold block, and a wall between said reaction chamber and said annular chamber being thermally conductive.

19. Apparatus for generating electrical power as claimed in claim 2 wherein the mounted end of each said fuel cell is mounted inside a tubular ceramic insulator, the ceramic insulator being cemented within an aperture through said manifold block.

20. Apparatus for generating electrical power as claimed in claim 5 wherein the mounted end of each said fuel cell is mounted inside a tubular ceramic insulator, the ceramic insulator being cemented within an aperture through said manifold block.

21. Apparatus for generating electrical power as claimed in claim 7 wherein the mounted end of each said fuel cell is mounted inside a tubular ceramic insulator, the ceramic insulator being cemented within an aperture through said manifold block.

22. Apparatus for generating electrical power as claimed in claim 8 wherein the mounted end of each said fuel cell is mounted inside a tubular ceramic insulator, the ceramic insulator being cemented within an aperture through said manifold block.

23. A method for generating electrical power, the method comprising:

providing a reaction chamber containing a plurality of open ended solid oxide fuel cells;

flowing an oxidizing gas in an oxidizing gas conduit, a portion of which passes through an exhaust stream, such that the oxidizing gas is heated by the exhaust stream as the oxidizing gas flows;

flowing a reformable fuel gas in a fuel gas conduit, a portion of which passes through the reaction chamber, such that the fuel gas is heated by the reaction chamber as the fuel gas flows;

flowing the fuel gas in a fuel cell direction of flow, along one of an inside or outside surface of at least one of the fuel cells;

flowing the oxidizing gas along a surface of the at least one fuel cell opposite the surface along which the fuel gas is flowing; and combusting an unreacted portion of the fuel gas in the exhaust stream with an unreacted portion of the oxidizing gas;

wherein a direction of flow of the oxidizing gas for at least a portion of the oxidizing gas conduit is parallel and opposite to the fuel cell direction of flow, and wherein a direction of flow of the fuel gas for at least a portion of the fuel gas conduit is parallel and opposite to the fuel cell direction of flow.

* * * * *